US 8,025,140 B2

(12) United States Patent
Whyte et al.

(10) Patent No.: US 8,025,140 B2
(45) Date of Patent: Sep. 27, 2011

(54) MATERIAL PROCESSING APPARATUS COMPRISING A CONVEYOR

(75) Inventors: Stephen A. Whyte, Omagh (IE); Stephen Wilkinson, Dungannon (IE)

(73) Assignee: Metso Minerals Inc., Helsinki (FI)

( * ) Notice: Subject to any disclaimer, the term of this patent is extended or adjusted under 35 U.S.C. 154(b) by 687 days.

(21) Appl. No.: 12/086,275

(22) PCT Filed: Dec. 9, 2005

(86) PCT No.: PCT/FI2005/050456
§ 371 (c)(1),
(2), (4) Date: Jun. 9, 2008

(87) PCT Pub. No.: WO2006/092473
PCT Pub. Date: Sep. 8, 2006

(65) Prior Publication Data
US 2010/0282568 A1    Nov. 11, 2010

(51) Int. Cl.
*B65G 15/26* (2006.01)
*B65G 21/10* (2006.01)

(52) U.S. Cl. ........ 198/317; 198/318; 198/313; 198/812; 198/861.4

(58) Field of Classification Search .................. 198/317, 198/318, 369.2, 369.4, 812, 861.4, 313
See application file for complete search history.

(56) References Cited

U.S. PATENT DOCUMENTS

| | | | | |
|---|---|---|---|---|
| 2,343,444 A * | 3/1944 | Coon | ............................. | 198/310 |
| 2,875,888 A * | 3/1959 | Swain et al. | ................... | 198/816 |
| 2,912,095 A * | 11/1959 | Palmer et al. | ............... | 198/316.1 |
| 3,581,874 A * | 6/1971 | Keith | ............................. | 198/317 |
| 3,884,346 A | 5/1975 | O'Neill et al. | | |
| 4,624,357 A * | 11/1986 | Oury et al. | .................... | 198/313 |
| 5,165,512 A * | 11/1992 | Driear | ............................ | 198/318 |
| 5,498,119 A * | 3/1996 | Faivre | ............................ | 414/528 |
| 5,819,950 A | 10/1998 | McCloskey | | |
| 6,378,686 B1 * | 4/2002 | Mayer et al. | ................... | 198/314 |
| 6,543,622 B1 * | 4/2003 | Fridman | ........................ | 209/421 |
| 7,182,284 B2 | 2/2007 | Jabs et al. | | |

FOREIGN PATENT DOCUMENTS

| | | | |
|---|---|---|---|
| EP | 0 641 607 A2 | 3/1995 | |
| GB | 1 480 688 | 7/1977 | |
| WO | WO 02/092231 A1 | 11/2002 | |
| WO | WO 2004/087324 | 10/2004 | |
| WO | WO 2004096677 A1 * | 11/2004 | ................ 198/861.2 |

* cited by examiner

*Primary Examiner* — Mark A Deuble
(74) *Attorney, Agent, or Firm* — Oliff & Berridge, PLC

(57) ABSTRACT

A material processing apparatus comprises a conveyor that is rotatable in vertical direction around a horizontal axis that is situated in an element rotatable in horizontal direction relative to the apparatus. The element is articulated to the apparatus at a main point of articulation, and at a point remote from the main point of articulation, articulated to a variable length element which in turn is articulated to the apparatus, and the element is connected to an actuator causing the horizontal rotational movement of the element together with the conveyor, defined by said main point of articulation.

12 Claims, 8 Drawing Sheets

MATERIAL PROCESSING APPARATUS COMPRISING A CONVEYOR

FIELD OF THE INVENTION

Figure 1:
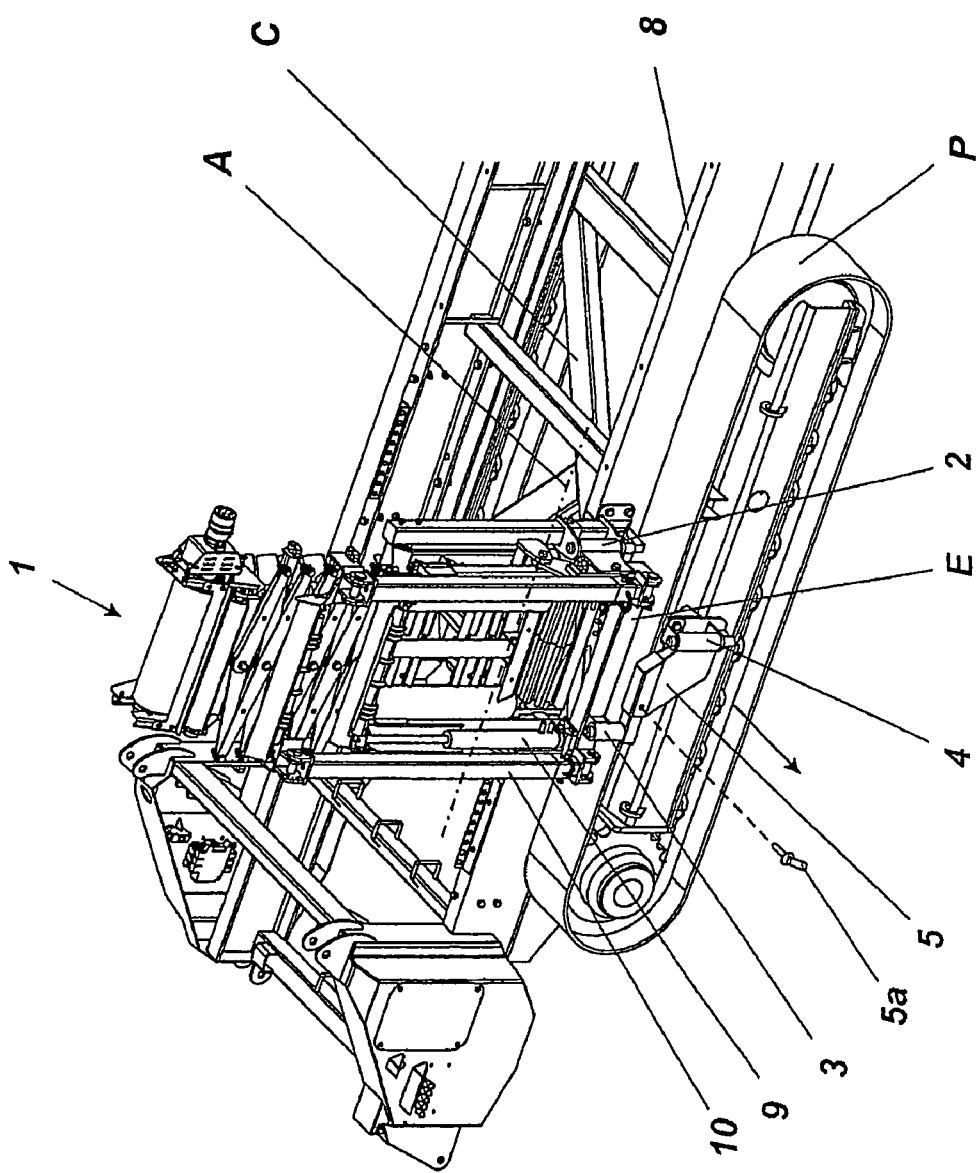

The present invention relates to a mobile or movable material processing apparatus comprising a conveyor, especially a conveyor adjustable in length. The invention relates in particular to such apparatuses that have a lateral conveyor extending sideways from the apparatus.

BACKGROUND OF THE INVENTION

Conveyors exist in many types and they perform various functions. The conveyors of the present invention are designed for transport of bulk material from an apparatus that has treated material in some way, to a location remote from the apparatus. The conveyor is therefore mounted on the apparatus and moves together with it. The apparatus may form a part of a larger plant that processes material and may contain many material flows. Bulk material means in this context material that is in particle form initially or at least after some operation of the process, typically after comminuting. The material can be different types of mineral materials, like gravel, sand, ore, coal, soil material, waste material, especially construction waste like concrete, bricks and asphalt, as well as organic material like wood chips, etc. The treatment operation after which the bulk material is transported on the conveyor can be for example a crushing or screening operation.

It is important in the overall operation of a plant of the aforementioned type that any material flow to a desired location takes place quickly and without disturbances. In processing plants, lateral conveyors are used in connection with mobile material processing apparatuses to transport material away from the apparatus, either to a point of dumping or intermediate storage, to form heaps or stockpiles for example, or to a further treatment operation in the process. The conveyor can transport the material even to a further conveyor. Because the lateral conveyor extends laterally from the chassis of the apparatus in the working position, it must be kept in transport position closer to the chassis during the transport of the apparatus. Therefore, its is important that the conveyor can be quickly put in a working position after the transport of the apparatus to a site or after the apparatus has moved inside the site to new location. Further, it is desirable that the point of discharge of the conveyor can be changed in a simple way and quickly without moving the apparatus. Finally, the combination of the apparatus and conveyor should be simple from a constructional point of view.

EP 0641607 B1 (Rafferty, M. J.) shows a mobile material processing apparatus providing movement of a lateral conveyor from operative position to transport position and vice versa so that the conveyor does not take much space in lateral direction in the transport position. Only one operative (working) position of the conveyor in the horizontal direction is provided. The conveyor is articulated so that in an upright position it can be bent in approximately L shape along the sides of the apparatus. This means that the conveyor is in its full working length even in the transport position.

WO 2004/087324 (Thyssenkrupp Fördertechnik GmbH) shows a comminution device in particular for use in open-cast mining and in the recycling industry. A front conveyor for transporting away comminuted material from the crusher is articulated rotatatable in vertical direction to a rotary bracket, which in turn is articulated in its middle on a support construction that is directly beneath the rotary bracket.

U.S. Pat. No. 5,819,950 (McCloskey, J. P.) shows a stockpiling conveyor mounted in front of a trommel screen and arranged pivotable in vertical direction on a turntable that is rotated by a pair of actuators. The basic constructional principle is much the same as in the above-mentioned WO 2004/087324.

WO 02/092231 (MMD Design and Consultancy Ltd.) shows a mobile mineral breaking station showing a conveyor extending along the longitudinal axis of the station and movable in the horizontal plane to either side of the longitudinal axis. The conveyor is also movable in vertical plane. This is achieved by pivotally mounting the conveyor on a cradle for rotation around horizontal axis and by mounting the cradle onto the chassis for rotation around a vertical axis.

U.S. Pat. No. 3,884,346 (Powerscreen International Ltd) shows an articulated conveyor assembly having a conveyor mounted with its input end under a chute that supplies material from a dewatering apparatus. The conveyor is arranged rotatable in horizontal direction by means of a swivel arrangement comprising a rotary actuator fixed on the lower arm of a C-frame mounted on the frame of the apparatus. The conveyor is supported by two stays that are journalled on the upper arm of the C-frame.

Finally, GB 1,480,688 (Machines & Structures Ltd.) shows a mobile screening apparatus having lateral conveyors which are pivotable around a vertical axis over an arc of 180° for delivery of material to different stockpiles. The input ends of the conveyors are pivoted on brackets extending laterally from the framework of the apparatus. A hydraulically operated mechanism may be provided for turning the lateral conveyors. The construction allowing the pivotal movement around the vertical axis is not shown in detail. These conveyors are also supported by stays. The conveyors are not pivotable in vertical direction, but can be swung in horizontal direction to a transport position where they lie longitudinally alongside the apparatus.

Consequently, the prior art so far has not been able to provide a conveyor which is simple to mount on the chassis of the apparatus during the assembly, which can be swung in horizontal direction between at least two working positions and locked in both positions, and which can be quickly put in transport position, where it takes minimum space, and taken out of the transport position quickly.

SUMMARY OF THE INVENTION

It is the object of the present invention to provide a combination of material processing apparatus and conveyor where the conveyor is attached to the apparatus by a construction which makes it possible to install the conveyor during the manufacture of the apparatus in a simple way. It is also the object of the invention to provide a construction that allows a conveyor to be mounted even on an existing material processing apparatus. Further, the object of the invention is to provide a combination of a material processing apparatus and conveyor which can be quickly brought from a transport position to a working position taking not much space, and vice versa.

To attain these objects, the material processing apparatus according to the invention is mainly characterized in that the horizontal axis of the conveyor is situated in an element articulated to the apparatus at a main point of articulation, and at a point remote from the main point of articulation, articulated to a variable length element which in turn is articulated to the apparatus, and the element is connected to an actuator causing the horizontal rotational movement of the element together with the conveyor, defined by said main point of articulation.

The variable-length element acts at the same time as a sort of trestle system supporting the element at a point remote from the main point of articulation, by the fact that it supports the element from below by being articulated to the apparatus at a point lower than the main point of articulation. In material processing apparatuses having endless tracks as propulsion elements (so-called crawler tracks), when mounting a lateral conveyor, the main point of articulation is most conveniently arranged on the chassis above the track element and the lower point of articulation of the trestle system is arranged on the frame of the track element (a construction inside the loop of the endless track).

The lateral conveyor, while being inclinable to various portions around the horizontal axis, will rotate in horizontal direction around said main point of articulation, for example from a position where the conveyor extends in a direction substantially perpendicular to the chassis to a position where the conveyor forms an acute angle with the chassis.

The length-variable trestle system can be used also to lock the conveyor in various horizontal positions relative to the chassis by simply arranging locking means in two parts, which may be telescopically mounted one inside the other. In the simplest form, the length where the parts can be locked to each other is the same in two different horizontal positions, if the different points of articulation are chosen suitably.

Further features and advantages, for example regarding the vertical movement of the conveyor, will be described in the following description and in the attached claims.

Figure 2:
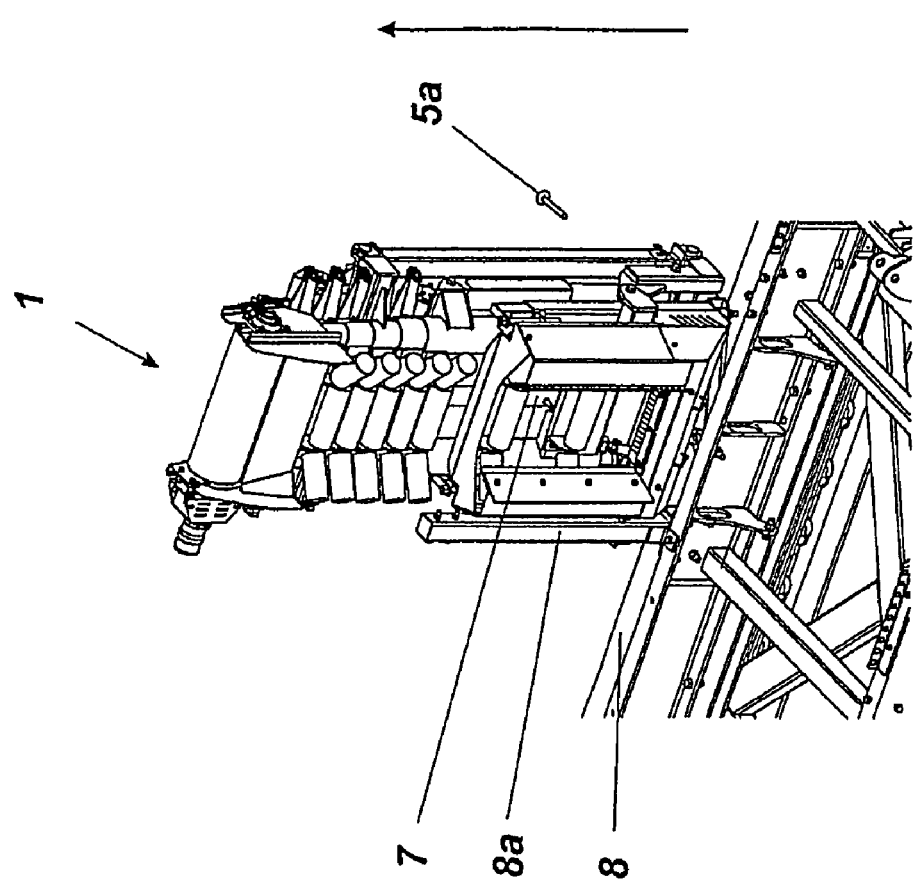
Figure 3:
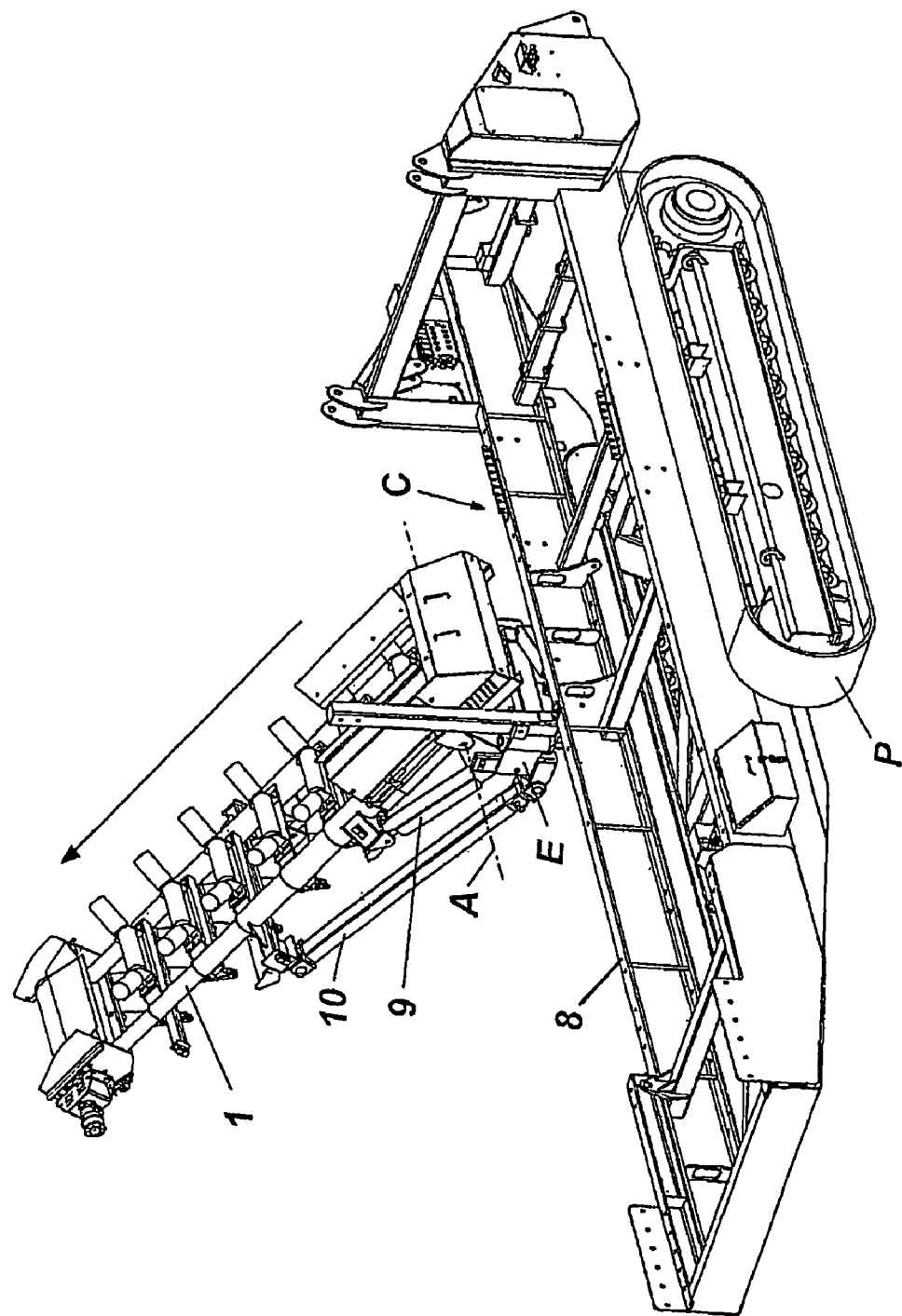
Figure 4:
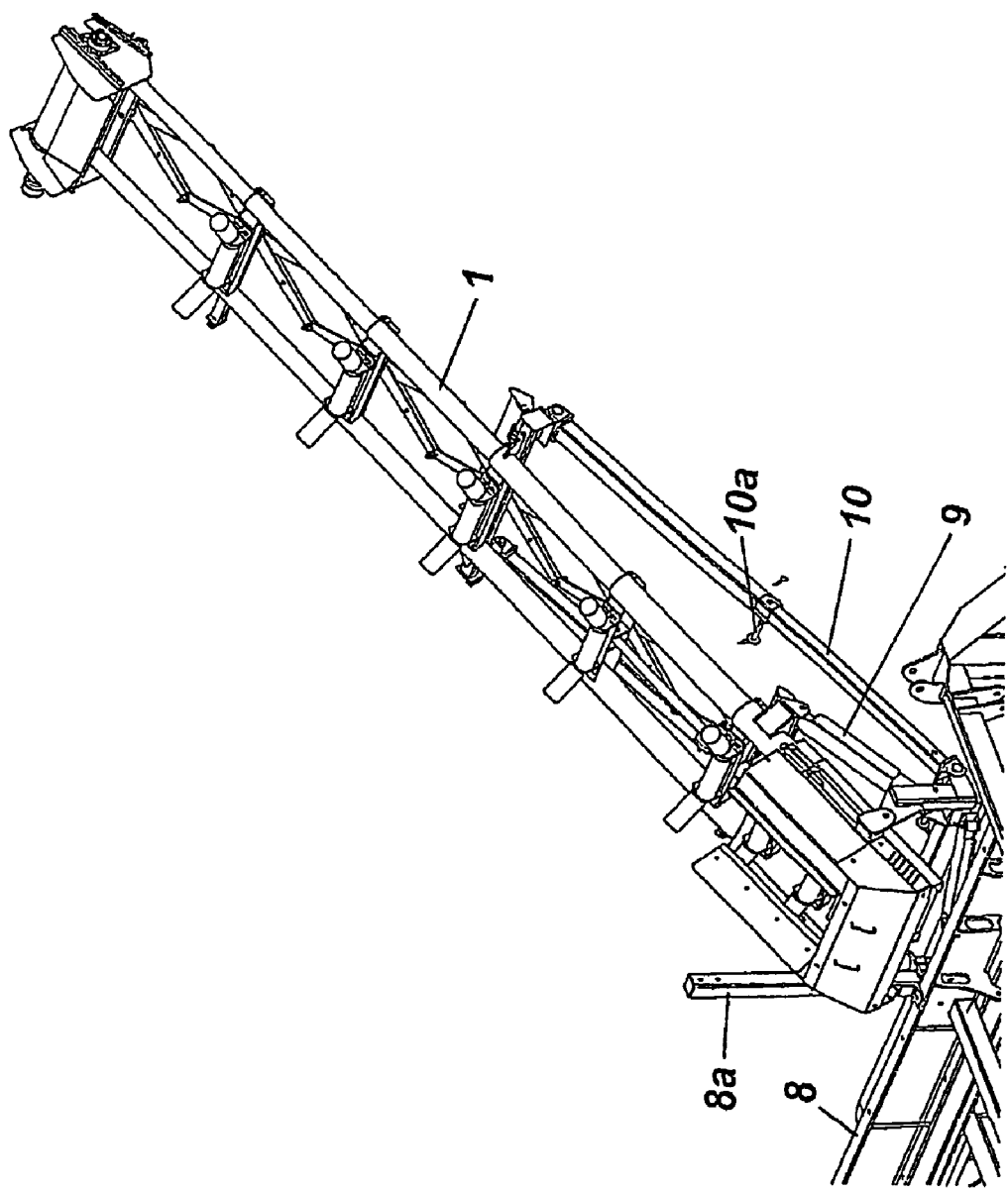
Figure 5:
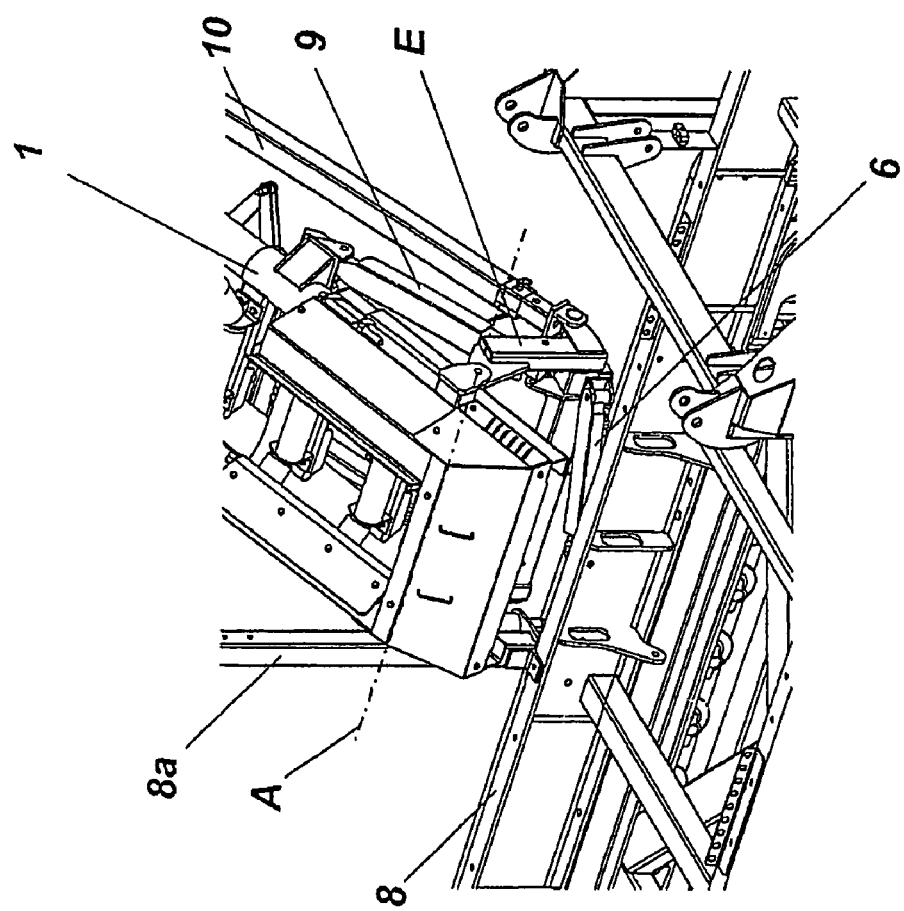
Figure 6:
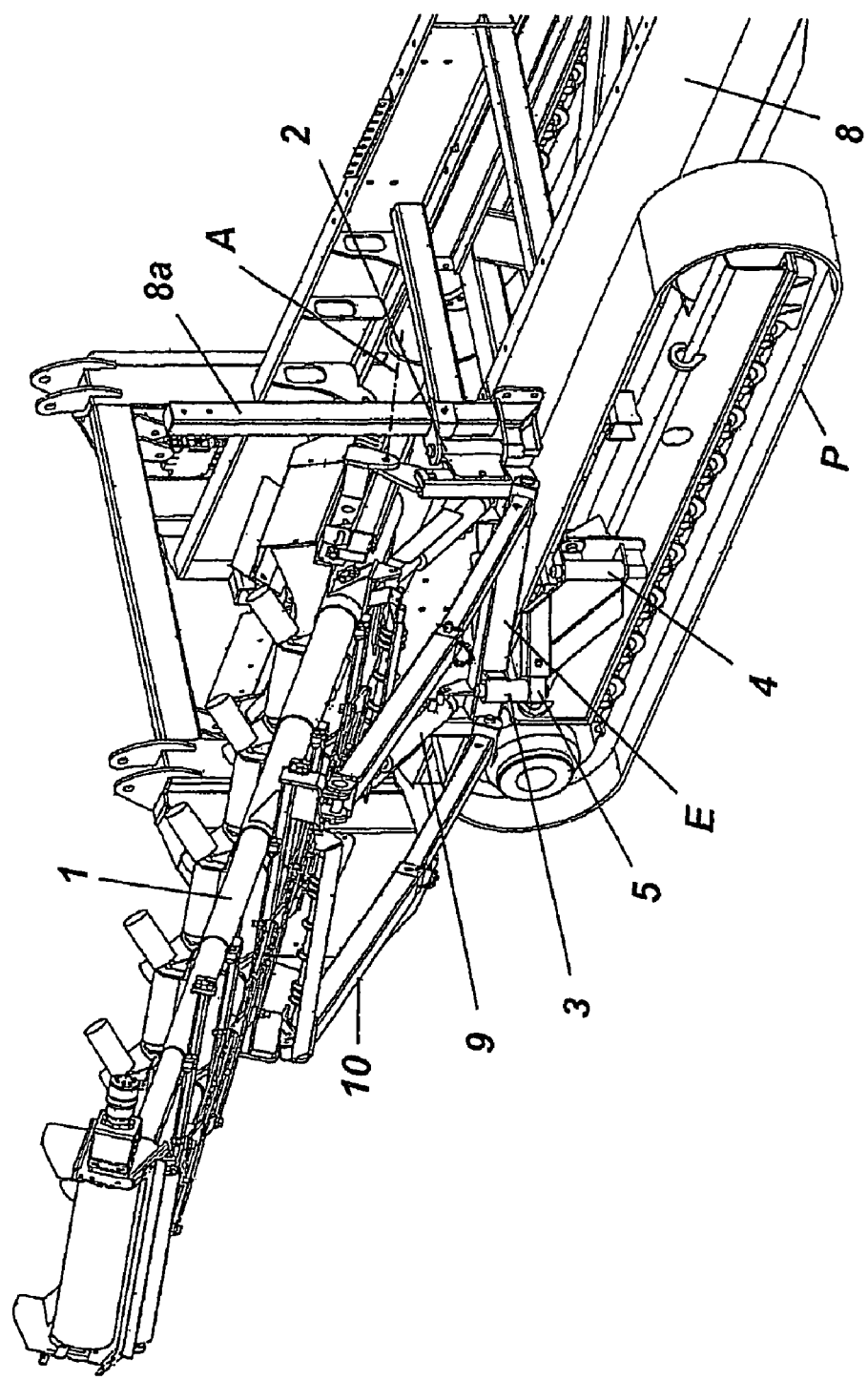
Figure 7:
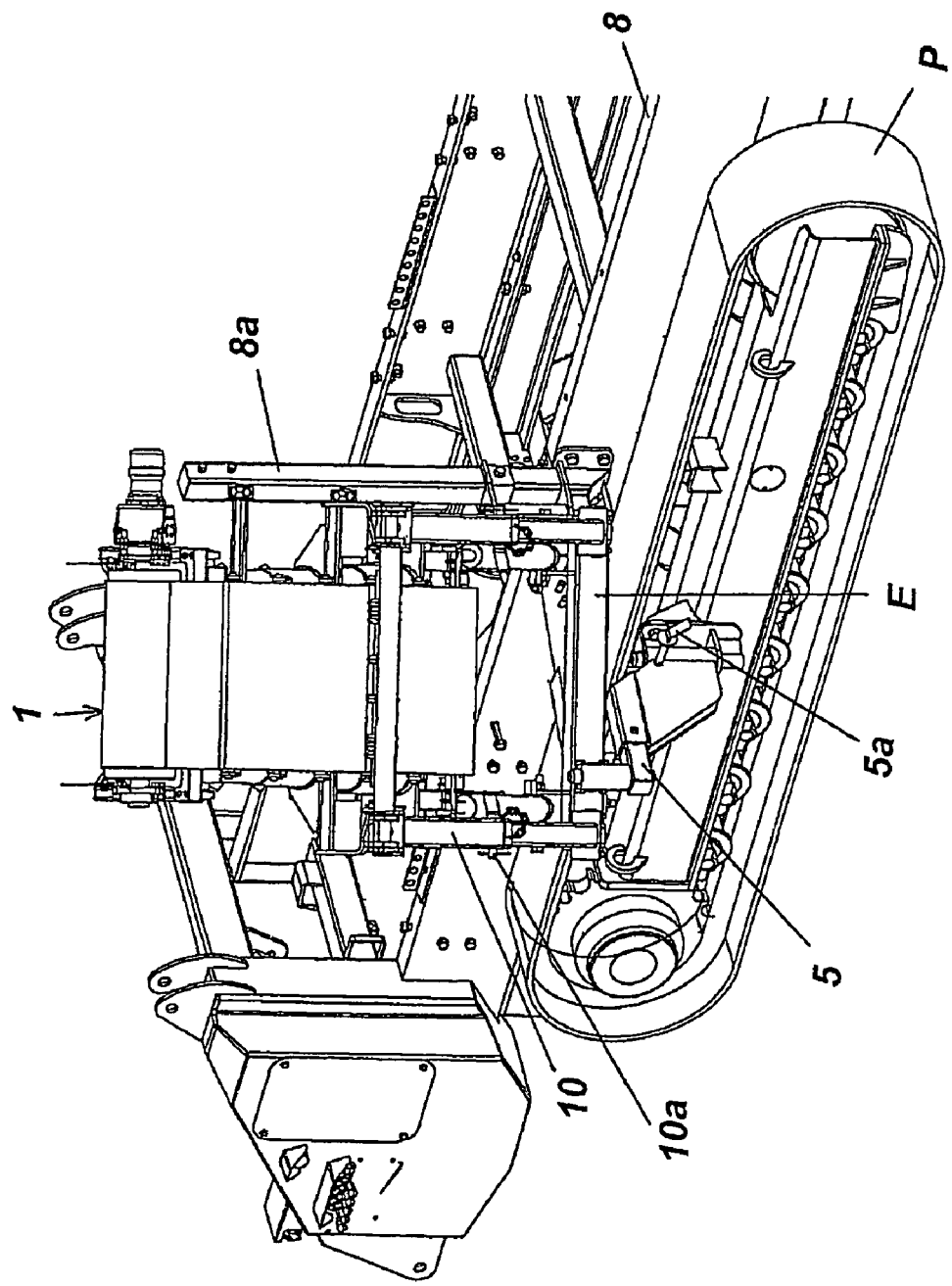
Figure 8:
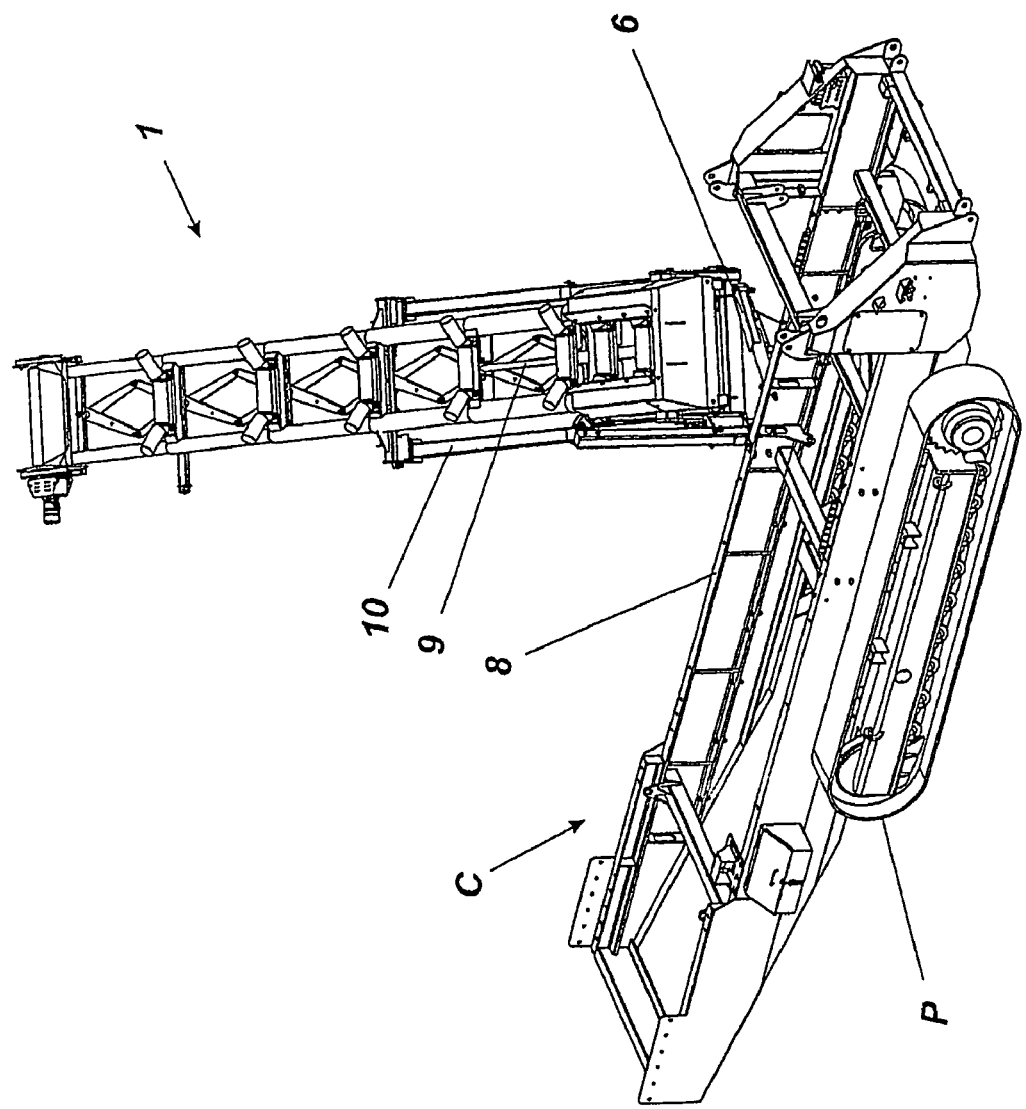

The invention will be described in more detail in the following description of some embodiments given by way of example only with reference to the accompanying drawings, in which FIG. 1 shows the conveyor and the apparatus in transport position before changing to working position in perspective view, FIG. 2 shows the same position from the opposite direction, FIG. 3 shows the apparatus with the conveyor being extended in the lowered working position, FIG. 4 shows the conveyor fully extended, FIG. 5 shows the conveyor from behind in a more detailed view, FIG. 6 shows the conveyor during the rotation phase, FIG. 7 shows the conveyor at the other position after the rotation phase, and FIG. 8 is an overall view of the apparatus, with the conveyor in the other horizontal position fully extended.

It should be noted that in the accompanying figures, the material processing apparatus is not shown fully equipped, only the propulsion elements and the chassis for attaching the conveyor being shown for clarity. The chassis has an elongated frame structure. The material processing apparatus is self-propelled so that it can move at least at the working site, but it is at least movable in the sense that it can be transported over longer distances by a suitable vehicle.

Further, in this context, horizontal direction means movement of one point in a horizontal plane either along a rectilinear or curved path. Therefore, a conveyor inclined in various positions or being in vertical position moves in a horizontal plane if it is rotated around a vertical axis defined by a point of articulation to a fixed structure.

FIG. 1 shows a mobile or movable material processing apparatus with a lateral conveyor 1 in transport position. The apparatus is self-propelled, that is, it can move at least short distances inside the working site through its own, ground-engaging propulsion elements P. In the case shown in FIG. 1, the propulsion elements P are endless track elements, on either side of the chassis C. The lateral conveyor can be rotated around a horizontal axis A to incline it in various positions, that is, it can be moved in the vertical plane according to a pivotal movement determined by said horizontal axis.

The conveyor 1 is also arranged pivotable around a vertical axis by the way of articulation to the chassis C which will be described in more detail later.

The conveyor 1 has also the feature of being extendible, that is, its transport length (working length) can be varied. The construction making this possible is not part of the present invention and is not described in more detail in this application. It can be only briefly stated that the conveyor can be extended and shortened by means of telescopic structure of the conveyor frame.

FIG. 1 shows a situation in which the conveyor is about to be changed from transport position, where it extends vertically above the propulsion element P, to working position. FIG. 1 shows the step where a locking pin 5a is already removed from a length-variable element 5, whose construction and function will be described later.

FIG. 2 shows the conveyor 1 in vertical position from behind (seen from the material processing apparatus). A push ram 7 for extending the length of the conveyor 1 is shown. A vertical post fixed to a horizontal side beam 8 of the chassis and forming the attachment for the main point of articulation is denoted with reference numeral 8a.

FIG. 3 shows a phase where the conveyor 1 is being extended using the push ram 7. The conveyor has also been rotated down in the vertical plane around the horizontal axis A. This movement is actuated by a pair of lifting/lowering rams 9 that act between the element E articulated to the chassis C by the main point of articulation 2, and the body of the conveyor 1, from which further sections of the conveyor can come out telescopically. Between the element and one extension section of the conveyor, there are two passive, length-variable supports 10 that form a sort of trestle for supporting the conveyor from below in fully extended position. It is possible to use the push ram 7 and the lifting/lowering rams 9 in conjunction with each other so that they operate at the same time. The fully extended position is shown in FIG. 4, where one length-variable element 10 is shown fully extended and its moving parts (telescopically operating) are being locked to each other by a stop pin 10a. This is the lowest position to which the conveyor can be lowered (about 24°) from the transport position (about 90°).

FIG. 5 shows the conveyor 1 from behind in more detail. A swivel ram actuating the rotation movement defined by the main point of articulation 2 of the element E to the chassis is denoted with reference sign 6.

The conveyor itself is made length-variable by an arrangement where several sections are placed one after the other and are arranged telescopically extendible and retractable inside each other. The push ram 7 acts on one such section and at the same time on a mechanism that causes the simultaneous extension or retraction of all other sections. The conveyor 1 is shown in all figures with the actual conveyor belt removed, showing only the rollers over which the belt is guided.

FIG. 6 is the most illustrative representation of the mounting system according to the invention. It shows the element E that carries the horizontal rotation axis A of the conveyor 1 (inclination at various angles). The rotation axis is situated at the upper parts of two legs that are in upright positions at both ends of the horizontal portion of the element E. The element E further carries the pivot joints for the length-variable elements 10 of the trestle and for the lifting/lowering rams 9 on its horizontal portion. One end of the element E is articulated to the chassis (to the post 8a) at the main point of articulation 2 formed by a pivot joint allowing the pivotal movement of the element E in horizontal plane. This pivot joint is attached to the side of one of the upright legs. Further, the element E has a pivot joint remote from its main articulation end and approximately on the same horizontal level with point 2. This pivot joint forms an articulation point 3 between the length-variable element 5 and the element E near the other end of the element on the front side of the horizontal portion of the element. This length-variable element 5 forms a sort of trestle system by supporting the element E from below. To achieve this supporting function, the length-variable element 5 is articulated to the chassis at a point lower than the main point of articulation 2 and point of articulation 3, at a point of articulation 4 that is formed by a pivot joint between the element 5 and the frame of the propulsion element P, that is, the frame of the track element. Structurally the element 5 comprises a bracket articulated at the lower point 4 to the apparatus. A horizontal two-part beam that lies below the element E is attached rigidly to the upper part of the bracket. The first part of the beam is fixed rigidly to the bracket and receives telescopically the second part that carries the vertical pivot joint forming the point of articulation 3 of the length-variable element 5 with the element E.

The actuator causing the pivotal movement of the element E in horizontal plane is pivotally connected to the rear side of the horizontal portion of the element E, and it is not shown in FIG. 6, but it is best seen in FIG. 5. The actuator is the swivel ram 6, acting between the horizontal side beam 8 of the chassis and the element E.

FIG. 6 shows a situation where the conveyor, fully extended, is being shifted from the initial position to a position where it will be directed at an acute angle to the chassis in horizontal plane. The length-variable element 5, the locking pin 5a removed, is in a fully retracted position during the phase shown in FIG. 6. The pivotal movement of the element E in the horizontal plane around the main point of articulation 2 is effected by the hydraulic swivel ram 6 acting between the side beam of the chassis and the element E.

FIG. 7 shows a situation in which the locking pin 5a is being re-inserted to the element 5 to fix the conveyor 1 to the other working position where it forms an acute angle, about 40 to 50°, with respect to the longitudinal direction of the material processing apparatus, 44° in the figure to be precise. Because the length-variable element 5 has returned to its initial length, the holes in the two parts are again aligned and the pin 5a can be inserted. This is achieved by the fact that the points 2, 3 and 4 form a changing triangle in the horizontal plane, where the side between points 3 and 4 is of variable length (corresponding to the element 5), and point 4 remains inside the turning radius formed by the side between points 2 and 3 during its pivotal movement.

FIG. 8 shows the same situation as overall view of the apparatus from the opposite direction, behind the conveyor 1.

Although the conveyor 1 is brought in the above description to the second working position (in an angle to the chassis) by first lowering and extending it and thereafter rotating it in horizontal direction by the swivel ram 6, it is possible to rotate the conveyor first while it is in upright position and only thereafter lower and extend it.

The apparatus can be brought from the working position to the transport position by performing the movements of the conveyor 1 in reverse order. The transport position of the conveyor 1 shown in FIGS. 1 and 2 is very compact. The conveyor 1 is locked in the retracted vertical position above the track element P by the variable length element 5. In this position the element E is substantially parallel to the longitudinal beam 8 of the chassis, while being attached to the side of the beam through the main point of articulation 2 and the post 8a.

The variable-length element 5 can be provided with more than two locking positions to lock the conveyor in one or several intermediate working positions between the extreme positions in horizontal direction. To achieve this, the lower parts of the elements 5 can be provided with one or more holes between the uppermost hole and the lowermost hole.

The material processing apparatus described above can be any apparatus in a process where bulk material is processed and transported. Although the apparatus shown in the figures is designed to carry a screen assembly for sorting the particles of bulk material, the invention is not restricted only to apparatuses of this type. The conveyor and its mounting arrangement can be used in other apparatuses as well, where bulk material is to be transported to a location remote from the apparatus. It is also clear that the apparatus can have more than one conveyor mounted according to the invention. For example lateral conveyors of the construction and mounting described above can be arranged on both sides of the elongate chassis of the apparatus.

The invention claimed is:

1. A material processing apparatus comprising:
   a conveyor comprising a first side and a second side and being rotatable in a vertical direction around a horizontal axis,
   a rotatable element comprising a first end and a second end and being rotatable in a horizontal direction relative to the apparatus and comprising said horizontal axis,
   a main point of articulation at the first end of the rotatable element where the rotatable element articulated to the apparatus for rotation in said horizontal direction, the first end of the rotatable element being positioned at the first side of the conveyor and the second end of the rotatable element being positioned at the second side of the conveyor,
   a variable length element articulated to the rotatable element at a first point remote from said main point of articulation and articulated to the apparatus at a second point, and
   an actuator connected to the rotatable element and causing the rotation of the rotatable element in said horizontal direction together with the conveyor around said main point of articulation.

2. The material processing apparatus as claimed in claim 1, wherein the variable length element acts as a trestle system supporting the rotatable element from below at said first point remote from the main point of articulation, by being articulated to the apparatus at the second point which is situated lower than the main point of articulation.

3. The material processing apparatus as claimed in claim 2, wherein the main point of articulation is arranged on a chassis of the apparatus, and the second point of articulation where the trestle system is articulated to the apparatus is arranged on a frame of a track element forming a propulsion element of the apparatus.

4. The material processing apparatus as claimed in claim 1, wherein the conveyor is a lateral conveyor rotatable together with said rotatable element around said main point of articulation from a position where the conveyor extends in a direction substantially perpendicular to a longitudinal direction of a chassis of the apparatus to a position where the conveyor forms an acute angle with the longitudinal direction of the chassis.

5. The material processing apparatus as claimed in claim 1, wherein the variable length element comprises locking means for releasably locking the conveyor in at least two different horizontal positions relative to a chassis of the apparatus.

6. The material processing apparatus as claimed in claim 5, wherein the variable length element comprises two parts movable with respect to each other to change a length of the variable length element, and locking means arranged to releasably lock said parts to each other.

7. The material processing apparatus as claimed in claim 6, wherein the two parts movable with respect to each other are telescopic parts.

8. The material processing apparatus as claimed in claim 1, wherein the conveyor is variable in length.

9. The material processing apparatus as claimed in claim 8, wherein the conveyor is movable from a working position to a transport position by retracting the conveyor from a working length to a transport length and by rotating the conveyor up in the vertical direction around the horizontal axis, and in the transport position the conveyor is in the vertical direction.

10. The material processing apparatus as claimed in claim 9, wherein the conveyor is attached to a longitudinal beam of a chassis of the apparatus at said main point of articulation, and in the transport position the rotatable element is substantially parallel with said longitudinal beam.

11. The material processing apparatus as claimed in claim 1, wherein in a working position the conveyor is supported from below by elongate elements mounted pivotally at one end of each of the elongate elements on the rotatable element.

12. The material processing apparatus as claimed in claim 11, wherein the elongate elements are variable in length and lockable in a fixed length.

\* \* \* \* \*